(12) United States Patent
Qiu et al.

(10) Patent No.: US 11,215,726 B2
(45) Date of Patent: Jan. 4, 2022

(54) INVERSION WITH EXPONENTIALLY ENCODED SEISMIC DATA (71) Applicant: PGS Geophysical AS, Oslo (NO)

(72) Inventors: Lingyun Qiu, Houston, TX (US); Jaime Ramos-Martinez, Houston, TX (US); Alejandro A. Valenciano Mavilio, Houston, TX (US)

(73) Assignee: PGS GEOPHYSICAL AS, Oslo (NO)

( * ) Notice: Subject to any disclaimer, the term of this patent is extended or adjusted under 35 U.S.C. 154(b) by 952 days.

(21) Appl. No.: 15/939,711

(22) Filed: Mar. 29, 2018

(65) Prior Publication Data

US 2019/0257968 A1 Aug. 22, 2019

Related U.S. Application Data

(60) Provisional application No. 62/633,293, filed on Feb. 21, 2018.

(51) Int. Cl.
*G01V 1/30* (2006.01)
*G01V 1/38* (2006.01)
(Continued)

(52) U.S. Cl.
CPC .............. *G01V 1/3808* (2013.01); *G01V 1/22* (2013.01); *G01V 1/282* (2013.01); *G01V 1/303* (2013.01);
(Continued)

(58) Field of Classification Search
CPC ........ G01V 1/3808; G01V 1/22; G01V 1/282; G01V 1/303; G01V 2210/48;
(Continued)

(56) References Cited

U.S. PATENT DOCUMENTS 8,386,218 B2 * 2/2013 Shin ...................... G01V 1/303
703/6
10,234,582 B2 * 3/2019 Zhang .................... G01V 1/282
(Continued)

OTHER PUBLICATIONS

Ramos-Martinez et al., "A Robust FWI gradient for high-resolution velocity model-building", SEG International Exposition and 86th Annual Meeting, 2016 (Year: 2016).*

(Continued)

*Primary Examiner* — Krystine E Breier (57) ABSTRACT

Inversion with exponentially encoded seismic data can include exponentially encoding acquired seismic data and associated synthetic seismic data, storing the exponentially encoded acquired seismic data and the exponentially encoded associated synthetic seismic data, determining a one-dimensional (1D) Wasserstein distance between the exponentially encoded acquired seismic data and the exponentially encoded associated synthetic seismic data, and generating an adjoint source based on the 1D Wasserstein distance. The example method also includes adapting a dynamic weight implementation of a sensitivity kernel to the adjoint source to build a gradient associated with the acquired seismic data and the associated synthetic seismic data, and iteratively inverting a waveform associated with the exponentially encoded acquired seismic data and the exponentially encoded associated synthetic seismic data based on the gradient. An image of a subsurface location can be generated based on results of the iterative inversions.

20 Claims, 6 Drawing Sheets

(51) Int. Cl.
*G01V 1/22* (2006.01)
*G01V 1/28* (2006.01)

(52) U.S. Cl.
CPC .... *G01V 2210/48* (2013.01); *G01V 2210/614* (2013.01); *G01V 2210/6161* (2013.01); *G01V 2210/67* (2013.01)

(58) Field of Classification Search
CPC ..... G01V 2210/614; G01V 2210/6161; G01V 2210/67
See application file for complete search history.

(56) References Cited

U.S. PATENT DOCUMENTS

| | | | | |
|---|---|---|---|---|
| 10,422,899 B2* | 9/2019 | Bansal | ............... | G01V 1/005 |
| 10,578,755 B2* | 3/2020 | Wang | ............... | G01V 1/282 |
| 10,928,534 B2* | 2/2021 | Warner | ............... | G01V 1/282 |
| 2017/0168178 A1 | 6/2017 | Crawley et al. | | |
| 2020/0309980 A1* | 10/2020 | Wang | ............... | G06F 30/20 |

OTHER PUBLICATIONS

Qiu etal, "Full Waveform inversion with an exponentially-encoded optimal transport norm", SEG International Exposition and 87th Annual Meeting, 2017 (Year: 2017).*

Ramos-Martinez et al., "A Robust FWI gradient for high-resolution velocity model-building", SEG International Exposition and 86th Annual Meeting, 2016 (Year: 2013).*

Metivier L, Brassier R, Merigot Q, Oudet E, Virieux J. Measuring the misfit between seismograms using an optimal transport distance: application to full waveform inversion. Geophysical Supplements to the Monthly Notices of the Royal Astronomical Society. Feb. 24, 2016;205 (1):345-77. (33 pgs).

Fang, Y., Engquist, B., Sun, J., & Froese, B. D. (2016). Application of Optimal Transport and the Quadratic Wasserstein Metric to Full-Waveform Inversion. arXiv preprint arXiv:1612.05075 (30 pgs).

Engquist, B., & Froese, B. D. (2013). Application of the Wasserstein metric to seismic signals. arXiv preprint arXiv: 1311.4581 (10 pgs).

International Search Report & Written Opinion for related PCT Application PCT/EP2019/054363, dated May 29, 2019 (16 pgs).

Qiu, et al., "Full-waveform Inversion with an Exponentially Encoded Optimal-transport norm"; SEG International Exposition and 87th Annual Meeting, Aug. 17, 2017 (5 pgs).

Yang, et al., "Application of Optimal Transport and the Quadratic Wasserstein Metric to Full-waveform Inversion" Geophysics, vol. 83, No. 1, Jan. 1, 2018 (20 pgs).

Ramos-Martinez, et al., "A Robust FWI Gradient for High-Resolution Velocity Model Building"; SEG International Exposition and 86th Annual Meeting, Sep. 1, 2016 (5 pgs).

* cited by examiner

Fig. 7D

INVERSION WITH EXPONENTIALLY ENCODED SEISMIC DATA

CROSS-REFERENCE TO RELATED APPLICATIONS

This application claims priority to U.S. Provisional Application 62/633,293, filed Feb. 21, 2018, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the sea surface and over a subterranean formation to be surveyed for mineral deposits. Receivers can be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control can cause the one or more sources, which can be air guns, marine vibrators, electromagnetic sources, etc., to produce signals at selected times. In some instances, each signal is essentially a wave called a wavefield that travels down through the water and into the subterranean formation. At each interface between different types of rock, a portion of the wavefield can be refracted, and another portion can be reflected, which can include some scattering, back toward the body of water to propagate toward the sea surface. The receivers thereby measure a wavefield that was initiated by the actuation of the source. In some instances, each signal is essentially a wavefield that is imparted into the subterranean formation, which can induce a different wavefield in response. The receivers can measure the different wavefield that was induced by the actuation of the source.

DETAILED DESCRIPTION

This disclosure is related generally to the field of marine surveying. Marine surveying can include, for example, seismic surveying or electromagnetic surveying, among others. During marine surveying, one or more sources are used to generate wavefields, and receivers (towed and/or ocean bottom) receive energy generated by the sources and affected by the interaction with a subsurface formation. The receivers thereby collect survey data, referred to herein as "seismic data" which can be useful in the discovery and/or extraction of hydrocarbons from subsurface formations.

A towed object, such as a source, a receiver, or a streamer, may be towed behind a marine survey vessel to collect the seismic data. A streamer can be a marine cable assembly that can include receivers and electrical or optical connections to transmit information collected by the receivers to the marine survey vessel. The streamer can include receivers such as seismic receivers (e.g., hydrophones, geophones, etc.) or electromagnetic receivers.

Using acquired seismic data, full waveform inversion (FWI) is a methodology that seeks to find a high-resolution, high-fidelity model, such as a velocity model, of a subsurface capable of matching individual synthetic waveforms with the acquired seismic data. This is achieved iteratively by determining and minimizing a data misfit (or "residual"), which is the difference between acquired seismic data, also known as recorded seismic data, and associated synthetic seismic data. Put another way, FWI iteratively updates a model and computes associated synthetic seismic data to reduce the data misfit between the acquired seismic data and the associated synthetic seismic data. Acquired seismic data, as used herein, comprises data acquired using sensors, receivers, and recording equipment, for instance as described with respect to FIG. 1. Synthetic seismic data, in at least one embodiment, comprises seismic data that has been simulated to look like real seismic data acquired in a seismic acquisition process.

The present disclosure is related to updating a model with a gradient such as an FWI gradient. A model is a map of the subsurface indicating physical parameters of a subsurface location. An example model is a velocity model. A velocity model is a map of the subsurface indicating velocities of waves at various locations in the subsurface.

As noted, FWI is a non-linear data-fitting procedure that aims at obtaining detailed estimates of subsurface properties from seismic data, such as the presence of a reservoir that may contain hydrocarbons. In FWI, given an initial guess of subsurface parameters, a model is predicted by solving a wave equation, which is then updated in order to reduce the data misfit between the observed and predicted data; this is repeated iteratively until the data misfit is as small as desired. FWI can be used to build high resolution velocity models in shallow water settings where recorded refracted energy can help resolve small scale geologic features down to the deepest turning point of the refracted energy. For deeper targets, such as those deeper than 3-5 kilometers (km), FWI may use reflected energy to update the velocity model. By using gradient computations according to some previous approaches, FWI may not be able to update low wavenumber components of the velocity model unless the recorded data includes coherent energy at low frequencies, such as less than 2 Hz. However, according to at least one embodiment of the present disclosure, low wavenumber components can be updated in the velocity model at greater depths.

FWI can produce high-resolution models of the subsurface, however in some prior approaches, FWI may not have desirable results based on the band-limited nature of seismic data and the limitations of acquisition geometries. Furthermore, non-convexity resulting from a least-squares norm (also known as a least-squares objective function) may cause local minima, such as cycle-skipping, particularly with seismic data lacking low frequency information. Some prior approaches to FWI use the least-squares norm for measuring the data misfit. As used herein, the least-squares norm is referred to an $L^2$ norm and comprises minimizing a sum squares of differences between a target value and an estimated value. The data misfit, which comprises a difference between acquired seismic data and associated synthetic seismic data ("predicted data"), is minimized with respect to a model parameter, and the model update is computed using the adjoint state method. The least-squares approach to FWI produces local minima because only the pointwise amplitude difference is measured with an $L^2$ norm even though the phase or travel-time information embedded in the data is more desired and applicable for the inversion. For instance, FWI with an $L^2$ norm includes cycle skipping that causes a solution to be trapped in a local minimum, potentially far from a true model.

In contrast, at least one embodiment of the present disclosure implements a Wasserstein distance, also known as the $W^2$ norm, based on the optimal transport theory for measuring the data misfit. Put another way, the Wasserstein distance is used as a data misfit, which in at least one embodiment is a misfit function. Such an example uses seismic data collected during seismic acquisition differently than in prior approaches and comprises exponential encoding of acquired seismic data and associated synthetic seismic data, a Wasserstein distance determination, and an enhancement of phase information as compared with use of the $L^2$ norm. In at least one embodiment, an adjoint source is calculated trace-by-trace based on a one-dimensional (1D) Wasserstein distance between acquired seismic data and associated synthetic seismic data. For instance, an explicit solution of the optimal transport is used over the real line resulting in increased efficiency in implementation as compared to prior approaches, with a computational complexity of the adjoint source proportional to the number of actuations, receivers, and the length of recording time. For example, the solution to an optimal transport problem can be evaluated in a finite number of basic operations for a 1D ("real line") Wasserstein distance, but not for a higher dimensional Wasserstein distance. In at least one embodiment, because a 1D Wasserstein distance is determined, as compared to a higher dimensional Wasserstein distance, computation complexity does not increase as compared to other approaches.

It is to be understood the present disclosure is not limited to particular devices or methods, which can, of course, vary. It is also to be understood that the terminology used herein is for the purpose of describing particular embodiments only and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The terms "include," "comprise," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures can be identified by the use of similar digits. For example, 126 may reference element "26" in FIG. 1, and a similar element may be referenced as 426 in FIG. 4. Analogous elements within a Figure may be referenced with a hyphen and extra numeral or letter. See, for example, elements 422-1, and 422-2 in FIG. 4. Such analogous elements may be generally referenced without the hyphen and extra numeral or letter. For example, elements 422-1 and 422-2 may be collectively referenced as 422. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
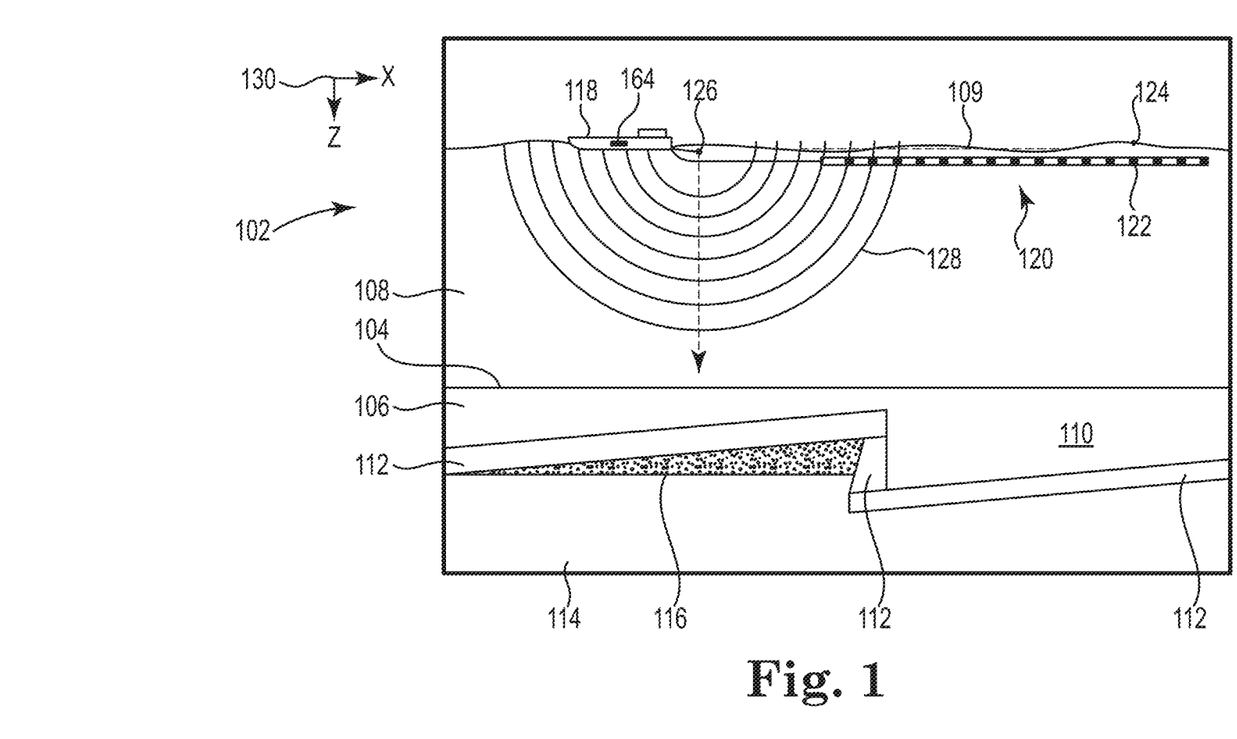
FIG. 1 illustrates an elevation or xz-plane view of marine surveying in which signals are emitted by a source for recording by receivers for processing and analysis in order to help characterize the structures and distributions of features and materials underlying the surface of the earth.

FIG. 1 illustrates an elevation or xz-plane 130 view of marine surveying in which signals are emitted by a source 126 for recording by receivers 122 for processing and analysis to help characterize the structures and distributions of features and materials underlying the surface of the earth. For example, such processing can include analogous processing of modeled and measured marine seismic data. The processing can include exponentially encoding acquired seismic data and associated synthetic seismic data, in at least one embodiment. The processing can also include determining a 1D Wasserstein distance between the exponentially encoded acquired seismic data and associated synthetic seismic data and determining a Fréchet derivative of the 1D Wasserstein distance.

FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden can include salt.

FIG. 1 shows an example of a marine survey vessel 118 equipped to carry out marine surveys. The marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers can be coupled. In one type of marine survey, each receiver, such as the receiver 122 represented by the shaded disk in FIG. 1, comprises sensors including a particle motion sensor that detects particle motion in at least one orientation within the water, such as particle velocity or particle acceleration, and/or a hydrophone that detects variations in pressure. In one type of marine survey, each receiver, such as receiver 122, comprises an electromagnetic receiver that detects electromagnetic energy within the water. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can include a controller 164, which is described in more detail with respect to FIGS. 4 and 5. For example, the controller 164 can be coupled to the streamer 120 and configured to receive data from receivers 122 therein in order to perform marine seismic analysis.

The marine survey vessel 118 can also tow one or more sources 126 that produce signals as the marine survey vessel 118 and streamers 120 move across the sea surface 109. In at least one embodiment, sources 126 can be controlled by controller 164. Sources 126 and/or streamers 120 can also be towed by other vessels or can be otherwise disposed in fluid volume 108. For example, receivers can be located on ocean bottom cables or nodes fixed at or near the surface 104, and sources 126 can also be disposed in a nearly-fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes. Data collected by receivers is referred to herein as acquired seismic data.

FIG. 1 shows an expanding, spherical signal, illustrated as semicircles of increasing radius centered at the source 126, representing a down-going wavefield 115, following a signal emitted by the source 126. The down-going wavefield 115 is, in effect, shown in a vertical plane cross section in FIG. 1. The outward and downward expanding down-going wavefield 128 can eventually reach the surface 104, at which point the outward and downward expanding down-going wavefield 115 can partially scatter, can partially reflect back toward the streamers 120, and can partially refract downward into the subsurface volume 106, becoming elastic signals within the subsurface volume 106.

Figure 2:
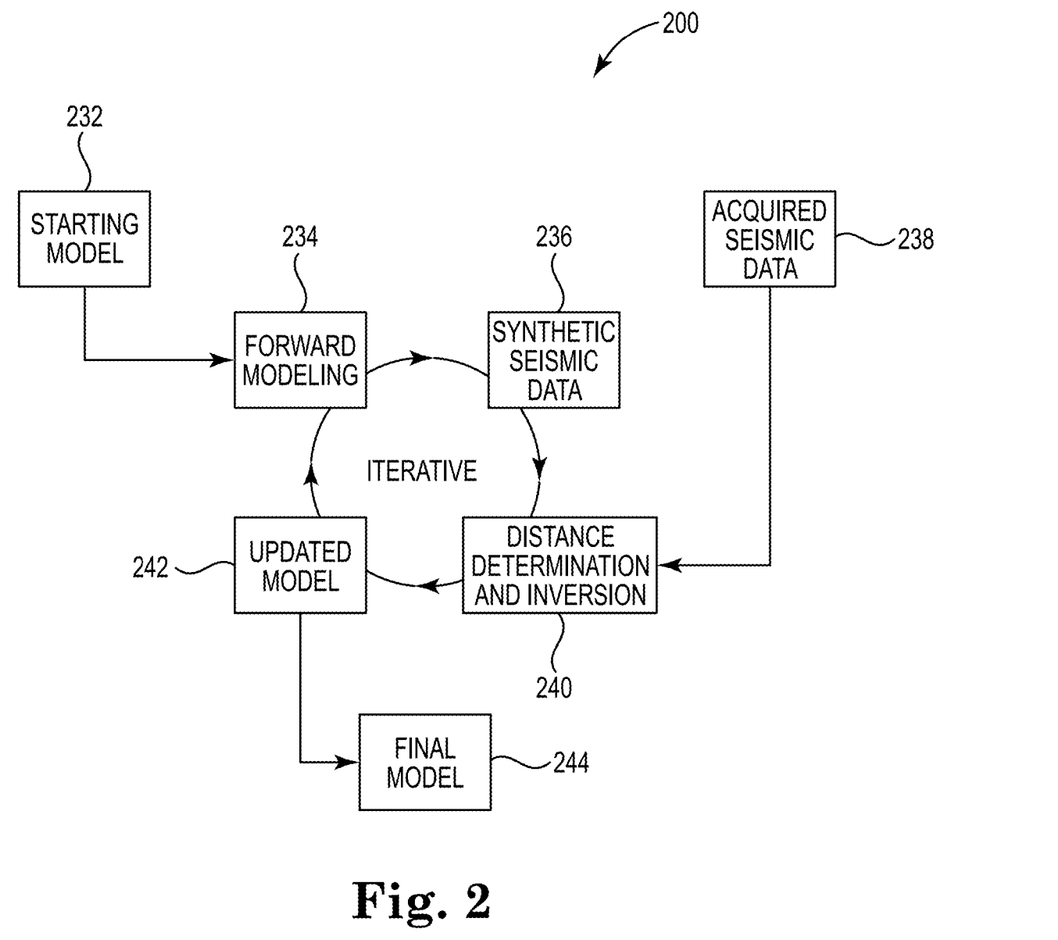
FIG. 2 illustrates an exemplary embodiment of a method flow diagram for inversion with exponentially encoded seismic data.

FIG. 2 illustrates an exemplary embodiment of a method flow diagram 200 for inversion with exponentially encoded seismic data. In at least one embodiment, the method can be performed by a system or a controller, such as the system illustrated in FIG. 4 or the machine illustrated in FIG. 5. Diagram 200 includes using a starting model at 232 and iteratively improving the starting model using a sequence of inversions, for instance such as FWI, inversion with a one-way migration operator (wavefield extrapolation migration (WEM), or inversion with a two-way migration operator (reverse time migration (RTM), until a final model is created at 244. As used herein, an inversion comprises transforming seismic data, including reflection data, into a quantitative rock-property description of a reservoir. Put another way, inversion comprises transforming the seismic data into a description, which may include a model, of a subsurface location. The seismic data, in at least one embodiment is in the form a waveform, which is the shape and form of a signal such as a wave moving in a physical medium or an abstract representation. The waveform may be depicted in a graph or model, among others.

In at least one embodiment, forward modeling is performed at 234 on the starting model. The starting model, also known as an initial guess, comprises a model containing information gathered using different subsurface imaging methods, such as tomography. Inversion, including FWI, is a method to iteratively improve the starting model, with the starting model being a base point to be updated. Forward modeling comprises, in at least one embodiment, solving a wave equation to determine synthetic seismic data associated with the starting model and the acquired seismic data. The synthetic seismic data is associated with the acquired seismic data such that it is modeled as a prediction of what the acquired seismic data may be. For instance, during forward modeling, synthetic seismic data can be modeled by solving an acoustic wave equation which governs propagation of acoustic waves through a material medium and describes the evolution of acoustic pressure or particle velocity as a function of position and time. A data misfit between the acquired seismic data and the synthetic seismic data can be determined, for instance at 240, which will be further discussed herein.

At 238 and 236, respectively, acquired seismic data and associated synthetic seismic data are used in a distance determination and inversion performed at 240. The distance determination can include a Wasserstein distance determination, such that the Wasserstein distance between the acquired seismic data and the associated synthetic seismic data is determined.

The Wasserstein distance is a metric from the theory of optimal transport in mathematics. The Wasserstein distance considers both phase shifts and amplitude differences. The Wasserstein distance is designed to measure the distance between two probability-density functions, and non-negativeness and unit mass are desired inputs when determining a Wasserstein distance. However, oscillation and sign-change are features of seismic data, so at least one embodiment of the present disclosure uses the Wasserstein distance as a data misfit that takes global features of seismic data into consideration and is robust to periodicity and sign-change. Since seismic data are not naturally positive, in at least one embodiment, a normalization method is used when performing Wasserstein distance-based inversion. This contrasts with prior approaches that lead to non-differentiable misfit functions and are not compatible with adjoint-state methods or lose information of original data during normalization. Normalization, as used herein, can refer to a method for adjusting values measured on different scales to a notionally common scale.

In at least one embodiment, the acquired seismic data and the associated synthetic seismic data are transformed into probability-density functions or probability-density function-like data before calculating the Wasserstein distance between them. A probability-density function is a function of a continuous random variable, whose integral across an interval gives the probability that the value of the variable lies within the same interval. For instance, the integral is one. Probability-density function-like data comprises data having an integral that is the same. For example, following exponential encoding discussed further herein, acquired seismic data in probability-density function-like data format has the same integral as associated synthetic seismic data in probability-density function-like format. Wasserstein distances between probability-density functions and distances between probability-density function-like data can be determined because of this same integral result.

As noted, in at least one embodiment of the present disclosure, seismic data is transformed into probability-distance functions or probability-distance function-like data using exponential encoding. Exponential encoding, as used herein, comprises using an exponential family of functions to transform the acquired seismic data and the associated synthetic seismic data. For instance, use of an exponential function such as log (exp(x)+1) may be used to transform the acquired seismic data and the associated synthetic seismic data into probability-distance functions or probability-distance function-like data. Other exponential families of functions may be used to transform into probability-distance functions or probability distance function-like data in at least one embodiment.

In at least one embodiment, because acquired seismic data and synthetic seismic data may not be naturally positive, the acquired seismic data and the associated synthetic seismic data are normalized in order to be transformed into probability-density functions or probability-distance function-like data. Phase information from the acquired seismic data is extracted for computing the Wasserstein distance because the Wasserstein distance considers both amplitude differences and phase shifts.

For instance, for acquired seismic data, d, which has both positive and negative values, an example exponential encoding algorithm is:

$$\tilde{d}=e^{\alpha d}$$

where $\alpha$ is a prescribed positive constant to control the upper bound of the power for the numerical accuracy. Since an exponential family of functions has a milder derivative on the negative half real axis, the above example treats the negative and positive part of the acquired seismic data differently. At the same time, the processed data is non-negative. In at least one embodiment, the example is applied to both the acquired seismic data and the associated synthetic seismic data with the same constant. With an additional scaling, the acquired seismic data d and associated synthetic seismic data u are transformed into probability-density functions $\tilde{d}$ and $\tilde{u}$. Using the probability-density functions, a Wasserstein distance is determined between the acquired seismic data and the associated synthetic seismic data.

The above example exponential encoding algorithm is an uneven encoding process such that the information in the positive part of the acquired seismic data and the associated synthetic seismic data is amplified and stored in $(1, +\infty)$, and the information from the negative part is compressed in $(0,1)$. In such an example, the phase information is extracted from the positive side of the seismic data for the inversion. In at least one embodiment, this exponential encoding process is invertible and Fréchet differentiable. Therefore, according to the chain rule, additional work includes multiplying an adjoint source by:

$$\frac{\partial \tilde{d}}{\partial d} = \alpha e^{\alpha d}.$$

As used herein, an adjoint source is a combination of Fréchet derivatives of receivers associated with the acquired seismic data and associated seismic data. An adjoint source, as used herein, is a right-hand side term ("source" term) of the wave equation when the wave equation is solved from an adjoint state variable. An adjoint source is a product of the adjoint state method, which is a numerical method for efficiently computing the gradient of a function or operator in a numerical optimization problem. The adjoint source, in at least one embodiment, is used to backpropagate, from the sea surface to a subsurface location, a data misfit between acquired seismic data and associated synthetic seismic data with a starting model of parameters for which to invert. For instance, the adjoint source is used to construct gradients or kernels used to update a model, as will be discussed further herein.

In at least one embodiment, inversion with the exponential encoding is biased to match travel-time provided by the positive signal. The negative side is used for inversion with reflection data. To make use of the phase information from the negative part of the acquired seismic data and the associated synthetic seismic data, the exponential encoding, which may be uneven, is balanced by considering data reformed by an exponential encoding map:

$$\tilde{d}=e^{-\alpha d}$$

In at least one embodiment, inversion is performed in an alternative manner. For instance, the exponential encoding is switched between $\tilde{d}=e^{\alpha d}$ and $\tilde{d}=e^{-\alpha d}$ every few iterations. A corresponding objective function is constructed as:

$$J = \sum_{actuation} \sum_{receiver} W_2^2(\tilde{u}, \tilde{d}).$$

In at least one embodiment, a corresponding modification for FWI is to use a new adjoint source computed as:

$$\frac{\partial J}{\partial u} = \sum_{actuation} \sum_{receiver} \left(\frac{\partial}{\partial \tilde{u}} W_2^2(\tilde{u}, \tilde{d}) \frac{\partial \tilde{u}}{\partial u}\right).$$

In at least one embodiment, $\tilde{d}$ and $\tilde{u}$ are 1D functions. Taking advantage of the explicit expression of the Wasserstein distance for distributions over the real line, in at least one embodiment, can result in the computational complexity for obtaining the adjoint source being $O(N_r N_s N_t)$ where $N_r$, $N_s$, and $N_t$ stand for the number of receivers, actuations, and times steps, respectively. The computation time as presented in the present disclosure is reduced as compared to other approaches using multi-dimensional functions to calculate the adjoint source, which is a subtraction with the same order of complexity $O(N_r N_s N_t)$.

The quadratic Wasserstein distance between two 1D pdfs $p_0$ and $p_1$ is defined as:

$$W_2^2(p_0,p_1)=\int_0^1 (f_0^{-1}(s)-f_1^{-1}(s))^2 ds$$

$$W_2^2(p_0,p_1)=\int_0^1 (f_0^{-1}(f_1(t))-t)^2 p_1(t) dt$$

Here, $f_0$ and $f_1$ are associated cumulative distribution functions and $.^{-1}$ stands for the pseudo-inverse defined as:

$$f^{-1}(t)=\inf\{s|f(s)>t\}.$$

The Fréchet derivative with respect to $p_1$ is given by:

$$\frac{\partial W_2^2(p_0, p_1)}{\partial p_1} = (f_0^{-1}(f_1(t))-t)^2 + \int_t^1 2\frac{\partial f_0^{-1}(x)}{\partial x}\bigg|_{x=f_1(s)} (f_0^{-1}(f_1(s))-s) p_1(s) ds.$$

The above equality can be simplified using the inverse function theorem which results in:

$$\frac{\partial W_2^2(p_0, p_1)}{\partial p_1} = (f_0^{-1}(f_1(t))-t)^2 + 2\int_{f_0^{-1}(f_1(t))}^1 (s - f_1^{-1}(f_0(s))) ds.$$

Both $f_0$ and $f_1$ are monotonic increasing functions. Hence $f_0^{-1}(f_1(t))$ and $f_{-1}^{-1}(f_0(t))$ are computed in operations and both are monotonic functions. Therefore, the adjoint source is obtained for a single trace with operations. The adjoint source, in at least one embodiment, is backward propagated to determine a gradient. An inversion process such as FWI continues responsive to determination of the adjoint source.

For instance, a dynamic weight implementation of sensitivity kernel such as a velocity sensitivity kernel or an impedance sensitivity kernel is adapted to the adjoint source to build the gradient able to separate wavelength components associated with a subsurface location model associated with the acquired seismic data. The dynamic weight implementation includes using weights to assemble components of the velocity sensitivity kernel to build the velocity sensitivity kernel, which in at least one embodiment is the gradient. The weights depend on time, and as such are referred to herein as dynamic weights. Adapting to the adjoint source to build the gradient comprises inserting dynamic weights in a velocity sensitivity kernel parameterized from a data misfit between acquired seismic data and associated synthetic seismic data. Inserting dynamic weights can cause the suppression of the high wavenumber components. In at least one embodiment, the gradient separates wavelength components associated with models including subsurface models comprising physical parameters such as velocity and impedance.

A velocity sensitivity kernel is defined as:

$$K_v(x) = K_k(x) - K_p(x)$$

and an impedance (Z) sensitivity kernel is defined as:

$$K_Z(x) = K_k(x) + K_p(x).$$

The impedance sensitivity kernel isolates high wavenumber components and the velocity sensitivity kernel corresponds to low wavenumber components. The impedance sensitivity kernel can be useful for migration, such as RTM, where a high-resolution model is desirable, and the velocity is fixed. The velocity sensitivity kernel can be useful for estimating a velocity model using inversion, such as FWI, where the low wavenumber components of the gradient are desirable and the high wavenumber components may be problematic as described above with respect to migration isochrones. A gradient can be derived by dynamically weighting the velocity sensitivity kernel. The dynamic weights can be used to suppress the high wavenumber components from the FWI gradient in a heterogeneous media. As used herein suppression of high wavenumber components means that the high wavenumber components are significantly reduced and/or removed. Assuming constant density, the FWI gradient can be expressed as:

$$G(x) = \frac{1}{2A(x)} \left\{ \int_t \left[ W_1(x,t) \frac{1}{v^2(x)} \frac{\partial S(x,t)}{\partial t} \frac{\partial R(x,T-t)}{\partial t} - W_2(x,t) \nabla S(x,t) \cdot \nabla R(x,T-t) \right] \right\},$$

where $W_1(x, t)$ and $W_2(x, t)$ are the dynamic weights and $A(x)$ is an illumination term.

An inversion process such as FWI continues responsive to the dynamic weight implementation adaption. The inversion can include iteratively inverting a waveform associated with the exponentially encoded acquired seismic data and the exponentially encoded associated synthetic seismic data based on the gradient. At 242, an updated model is generated. An iterative process including elements 234, 235, 238, 240, and 242 continues until a desired final model is produced at 244. For instance, when an updated model includes desired information with a desired accuracy, the updated model may be considered the final model, for instance at 244. The final model, in at least one embodiment, is used to generate the image of the subsurface location.

Figure 3:
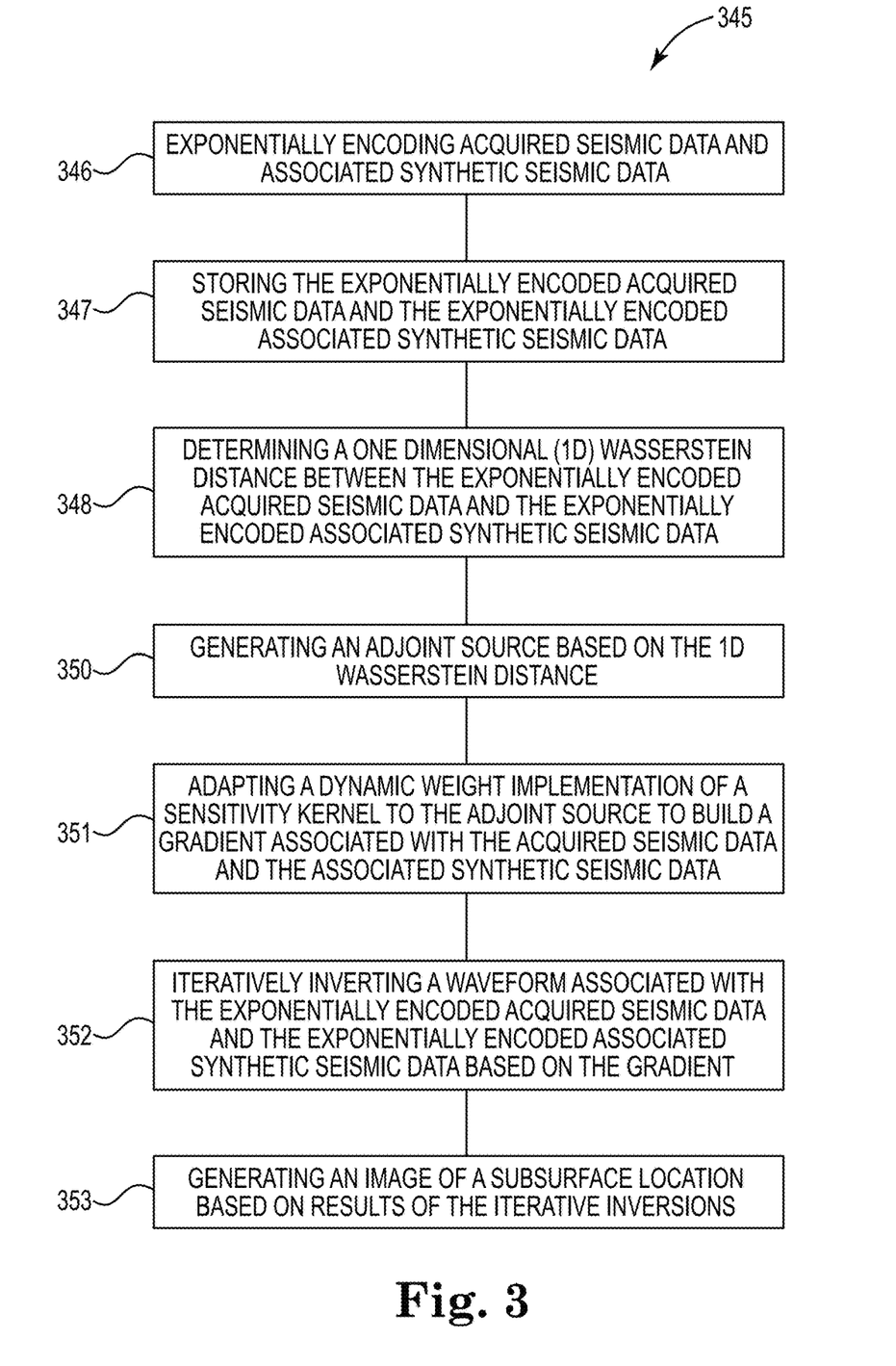
FIG. 3 illustrates another exemplary embodiment of a method flow diagram for inversion with exponentially encoded seismic data.

FIG. 3 illustrates another exemplary embodiment of a method flow diagram 345 for inversion with exponentially encoded seismic data. In at least one embodiment, the method can be performed by a system or a controller, such as the system illustrated in FIG. 4 or the machine illustrated in FIG. 5. In at least one embodiment, the method described with respect to method flow diagram 345 can be performed using algorithms described with respect to FIG. 2, though examples are not so limited.

At 346, the method includes exponentially encoding acquired seismic data and associated synthetic seismic data. For instance, in order to transform the acquired seismic data and associated synthetic seismic data into data that can be measured using a Wasserstein distance, the acquired seismic data and associated synthetic seismic data is exponentially encoded using an exponential family of functions to transform the acquired seismic data and associated synthetic seismic data into probability-density functions or probability-density function-like data. A Wasserstein distance can be more accurately measured between probability-density functions or probability-density function-like data as compared to other data-types. For instance, the exponentially encoded acquired seismic data and the exponentially encoded synthetic seismic data can have a Wasserstein distance between them more accurately measured as compared to non-exponentially encoded acquired seismic data and non-exponentially encoded synthetic seismic data In at least one embodiment, the exponentially encoded acquired seismic data and the exponentially encoded associated synthetic data are normalized to transform the exponentially encoded acquired seismic data and the exponentially encoded associated synthetic data to the probability-density functions or probability-density function-like data. For instance, the exponential encoding and normalization can allow for comparison of the acquired seismic data and associated synthetic seismic data in the form of determining a Wasserstein distance between them. In at least one embodiment, positive data associated with the exponentially encoded acquired seismic data and the exponentially encoded associated synthetic data is normalized.

At 347, the method includes storing the exponentially encoded acquired seismic data and the exponentially encoded associated synthetic seismic data. For instance, the exponentially encoded seismic data and the exponentially encoded associated synthetic seismic data can be stored in a data store as described with respect to FIG. 4. In at least one embodiment, the exponentially encoded acquired seismic data and the exponentially encoded associated synthetic seismic data can be stored onshore or offshore.

At 348, the method includes determining a 1D Wasserstein distance between the exponentially encoded acquired seismic data and the exponentially encoded associated synthetic seismic data. As used herein, determining a 1D Wasserstein distance comprises determining a Wasserstein distance between 1D seismic data which includes, for instance, 1D signal data. Accordingly, in at least one embodiment, the exponentially encoded acquired seismic data and the exponentially encoded associated synthetic seismic data are 1D.

As noted, the Wasserstein distance is a metric from the theory of optimal transport. A Wasserstein distance considers both phase shifts and amplitude differences in seismic data. As a result, in at least one embodiment, phase information of the acquired seismic data and the associated synthetic seismic data is enhanced as compared to a lack of enhancement when using $L^2$ norm. Phase information comprises phase shift data or other phase information associated with the acquired seismic data and the associated synthetic seismic data. Because a 1D Wasserstein distance is determined in contrast to other approaches using higher dimensions, the implementation of an adjoint source, as will be discussed further herein, has the same or reduced order of computational complexity as of the $L^2$ norm. In at least one embodiment, the Fréchet derivative of the 1D Wasserstein distance is determined.

The method, at 350, includes generating an adjoint source based on the 1D Wasserstein distance. For instance, the adjoint source is calculated trace-wise based on a one-dimensional (1D) Wasserstein distance between acquired seismic data and associated synthetic seismic data. At 351, the method includes adapting a dynamic weight implementation of a sensitivity kernel to the adjoint source to build a gradient associated with a subsurface location model associated with the acquired seismic data. In at least one embodiment, the sensitivity kernel is a velocity sensitivity kernel or an impedance sensitivity kernel.

For example, responsive to the adjoint source generation, backward propagation can be performed, and a gradient can be built. The adjoint source is used to backpropagate, from the surface to the subsurface, the data misfit between the acquired seismic data and the associated synthetic seismic data with an initial guess of physical parameters, such as velocity including wave velocity, and impedance including acoustic impedance, for which the inversion is being performed to determine.

At 352, the method includes iteratively inverting a waveform associated with the exponentially encoded acquired seismic data and the exponentially encoded associated synthetic seismic data based on the gradient. Inversions can be performed until a desired final model is determined. At 353, the method can include generating an image of a subsurface location based on results of the iterative inversions. For instance, the image can include results of the inversion including elements of the subsurface location such as subsurface physical parameters including wave velocity and impedance, among others. In at least one embodiment, wave velocity comprises the velocity at which a wave phase propagates at a certain frequency, and impedance comprises acoustic impedance between rock layers. The image of the subsurface location can be stored in a data store or other storage location, for example. In at least one embodiment, the iterative inversions are iterative FWIs.

In at least one embodiment, the method described with respect to FIG. 3 includes a process for generating an image of a subsurface location in which a plurality of sources is activated to produce signals measured by a receiver for use in generating the image, wherein the method is a specific improvement consisting of one or more of elements 346, 347, 348, 350, 351, 352, and 353 of the method. In at least one embodiment, the specific improvement can include generating the image based on results of the iterative inversions, thereby enhancing the image due to more accurate iterative inversions resulting from exponential encoding of the acquired seismic data and the associated synthetic seismic data.

In at least one embodiment of the present disclosure, the method described with respect to FIG. 3 includes a process for generating an image of a subsurface location in which acquired and synthetic data are transformed to a probability distribution and a Wasserstein norm is computed for use in generating the image, wherein the method is a specific improvement consisting of one or more of elements 346, 347, 348, 350, 351, 352, and 353 of the method. In at least one embodiment, the specific improvement can include generating the image based on results of the iterative inversions, thereby enhancing the image due to more accurate iterative inversions resulting from exponential encoding of the acquired seismic data and the associated synthetic seismic data.

Figure 4:
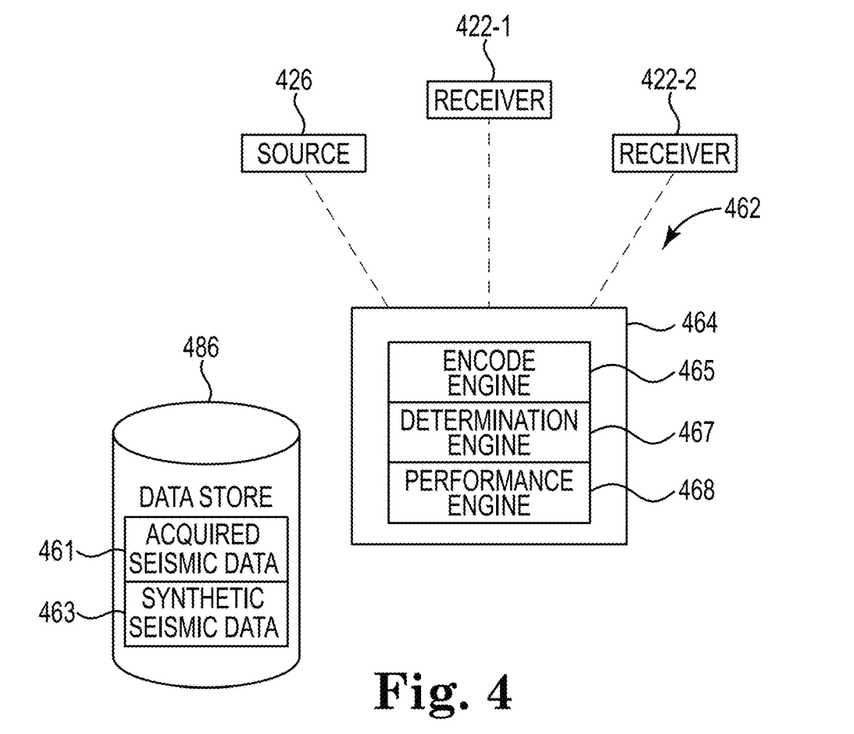
FIG. 4 illustrates a diagram of an exemplary embodiment of a system for inversion with exponentially encoded seismic data.

FIG. 4 illustrates an exemplary embodiment of a diagram of a system 462 for inversion with exponentially encoded seismic data. The system 462 can include a data store 486 and a controller 464. The controller 464 can include engines, such as an encode engine 465, determination engine 467, and performance engine 468. The controller 464 and engines can be in communication with the data store 486 via a communication link. The system 462 can include additional or fewer engines than illustrated to perform the various functions described herein. The system can represent program instructions and/or hardware of a machine such as the machine 564 referenced in FIG. 5, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

Figure 5:
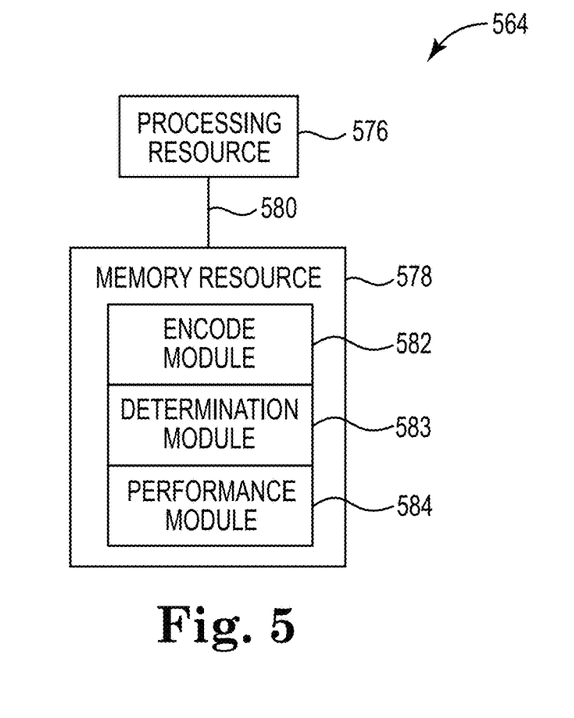
FIG. 5 illustrates a diagram of an exemplary embodiment of a machine for inversion with exponentially encoded seismic data.

The controller 464 can include a combination of hardware and program instructions that is configured to perform a plurality of functions for inversion with exponentially encoded seismic data as described herein, for instance with respect to FIGS. 2, 3, and 5. For example, in at least one embodiment, the controller 464 being analogous to the controller 164 illustrated in FIG. 1 can be configured to operate the source 426 and receive data from the receivers 422-1 and 422-2. Data stored in the data store 486 includes seismic data 461 acquired from the receivers 422-1 and 422-2 and associated synthetic seismic data 463. More or fewer sources or receivers than illustrated in FIG. 4 may be coupled to system 462.

In at least one embodiment, the acquired seismic data 461 has a frequency above a particular threshold. For instance, the acquired seismic data 461 may not have a low frequency, which is frequency below the particular threshold that is suitable for FWI, such as less than 2 Hertz (Hz). For instance, the acquired seismic data 461, in at least one embodiment, has a frequency higher than allowable for conventional FWI. Because the acquired seismic data 461 is exponentially encoded, and a Wasserstein distance is determined prior to an inversion iteration, low frequencies of data and/or complex starting models can be avoided. In addition, because a less complex model having higher frequencies can be used, computation costs and time can be saved as compared to other approaches because complex topography determinations may not need to be made for starting models. For instance, at least one embodiment of the present disclosure solves the technical problem of expending computational resources on complex topography determinations while determining starting models. By avoiding complex starting models, the technical problem of computation lag or lack of computation resources is solved because computation resources are preserved and are available for other computational purposes.

The controller 464 preserves phase information associated with the acquired seismic data 461 and the associated synthetic seismic data 463, and in at least one embodiment, calculates a data misfit between the acquired seismic data 461 and the associated synthetic seismic data 463. In at least one embodiment, the data misfit is a 1D Wasserstein distance.

With respect to the phase information, exponential encoding of the acquired seismic data 461 and the associated synthetic seismic data 463 transforms the acquired seismic data 461 and the associated synthetic seismic data 463 into probability-density functions or probability-density function-like data, which allows for preservation of phase information as compared to $L^2$ norm approaches that may destroy phase information.

The engines can include a combination of hardware and program instructions that is configured to perform functions described herein. The program instructions, such as software, firmware, etc., can be stored in a memory resource such as a machine-readable medium, etc., as well as hard-wired program such as logic. Hard-wired program instructions can be considered as both program instructions and hardware.

The encode engine 465 can include a combination of hardware and program instructions that is configured to exponentially encode acquired seismic data 461 and associated synthetic seismic data 463. The acquired seismic data 461 and the associated synthetic seismic data 463 is transformed to probability-density functions or probability-density function-like data during exponential encoding.

The determination engine 467 can include a combination of hardware and program instructions that is configured to determine a 1D Wasserstein distance between the exponentially encoded acquired seismic data and the exponentially encoded associated synthetic seismic data, and in at least one embodiment, the determination engine 467 can include a combination of hardware and program instructions that is configured to generate an adjoint source based on the 1D Wasserstein distance. The adjoint source, in at least one embodiment, is generated based on a difference between a first arrival time function associated with the acquired seismic data 461 and a second arrival time function associated with the associated synthetic seismic data 463. For example, responsive to the acquired seismic data 461 and the associated synthetic seismic data 463 being encoded and normalized, cumulative functions can be calculated for each set of exponentially encoded seismic data such that the value of each respective cumulative function is referred to as an energy form. Put another way, a cumulative function value associated with the acquired seismic data 461 may be referred to as a first energy form, while a cumulative function value associated with the associated synthetic seismic data 463 may be referred to as a second energy form. The inverse of the first energy form (cumulative function value associated with the acquired seismic data 461) is interpreted as an arrival time function associated with the acquired seismic data 461. The inverse of the second energy form (cumulative function value associated with the associated synthetic seismic data 463) is interpreted as an arrival time function associated with the associated synthetic seismic data 463. A difference between the arrival time functions can be determined as a Wasserstein distance, in at least one embodiment, and can be used to generate the adjoint source.

In at least one embodiment, the determination engine 467 can include a combination of hardware and program instructions that is configured to adapt a dynamic weight implementation of a sensitivity kernel to the adjoint source to build a gradient associated with the acquired seismic data and the associated synthetic seismic data. For example, the adjoint source is used to construct the gradient or the sensitivity kernel used to update a model. The sensitivity kernel includes a velocity sensitivity kernel or an impedance sensitivity kernel.

The performance engine 468 can include a combination of hardware and program instructions that is configured to iteratively perform an FWI on a waveform associated the exponentially encoded acquired seismic data and the exponentially encoded associated synthetic seismic data based on the adjoint source having the adapted dynamic weight implementation. For instance, iterations can be performed until a desired, final model is obtained, and in at least one embodiment, an image of a subsurface location is generated based on the results of the iterative FWI.

FIG. 5 illustrates an exemplary embodiment of a diagram of a machine 564 for inversion with exponentially encoded seismic data. The machine 564 can utilize software, hardware, firmware, and/or logic to perform functions. The machine 564 can be a combination of hardware and program instructions configured to perform functions. The machine is also generally referred to herein as a system and can include a controller (not illustrated in FIG. 5) analogous to the controller 464 illustrated in FIG. 4. The hardware, for example, can include processing resources 576 and memory resources 578, such as a machine-readable medium or other non-transitory memory resources 578. In at least one embodiment, the controller can include the memory resources 578 and the processing resources 576 and can be communicatively coupled to a streamer, a source, and a receiver. As used herein, "communicatively coupled" can include coupled via various wired and/or wireless connections between devices such that data can be transferred in various directions between the devices. The coupling need not be a direct connection, and in some examples, can be an indirect connection. The streamer, the source, and the receiver can be part of the system.

The memory resources 578 can be internal and/or external to the machine 564. For example, the machine 564 can include internal memory resources and have access to external memory resources. The program instructions, such as machine-readable instructions, can include instructions stored on the machine-readable medium to implement a function, for example, an action such as inversion with exponentially encoded seismic data. The set of machine-readable instructions can be executable by one or more of the processing resources 576. The memory resources 578 can be coupled to the machine 564 in a wired and/or wireless manner. For example, the memory resources 578 can be an internal memory, a portable memory, a portable disk, or a memory associated with another resource, for example, enabling machine-readable instructions to be transferred or executed across a network such as the Internet. As used herein, a "module" can include program instructions and/or hardware, but at least includes program instructions.

Memory resources 578 can be non-transitory and can include volatile and/or non-volatile memory. Volatile memory can include memory that depends upon power to store data, such as various types of dynamic random-access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and a solid-state drive, etc., as well as other types of non-transitory machine-readable media.

The processing resources 576 can be coupled to the memory resources 578 via a communication path 580. The communication path 580 can be local or remote to the machine 564. Examples of a local communication path 580 can include an electronic bus internal to a machine, where the memory resources 578 are in communication with the processing resources 576 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 580 can be such that the memory resources 578 are remote from the processing resources 576, such as in a network connection between the memory resources 578 and the processing resources 576. That is, the communication path 580 can be a network connection. Examples of such a network connection can include a local area network, wide area network, personal area network, and the Internet, among others.

As shown in FIG. 5, the machine-readable instructions stored in the memory resources 578 can be segmented into a plurality of modules 582, 583, and 584 that when executed by the processing resources 576 can perform functions. As used herein a module includes a set of instructions included to perform a particular task or action. The modules 582, 583, and 584 can be sub-modules of other modules. For example, the determination module 583 can be a sub-module of the performance module 584. In at least one embodiment modules 582, 583, and 584 can be contained within a single module. Furthermore, the modules 582, 583, and 584 can comprise individual modules separate and distinct from one another. Examples are not limited to the specific modules 582, 583, and 584 illustrated in FIG. 5. Although not specifically illustrated, the memory resources 578 can store (at least temporarily) acquired synthetic seismic data for operation thereon by the encode module 582, determination module 583, and performance module 584.

Each of the modules 582, 583, and 584 can include program instructions or a combination of hardware and program instructions that, when executed by a processing resource 576, can function as a corresponding engine as described with respect to FIG. 4. For example, the encode module 582 can include program instructions or a combination of hardware and program instructions that, when executed by a processing resource 576, can function as the encode engine 465. The determination module 583 can include program instructions or a combination of hardware and program instructions that, when executed by a processing resource 576, can function as the determination engine 467. The performance module 584 can include program instructions or a combination of hardware and program instructions that, when executed by a processing resource 576, can function as the performance engine 468.

For example, in at least one embodiment, the encode module 582 can include program instructions that, when executed by the processing resource 576, exponentially encode acquired seismic data and associated synthetic seismic data. The exponential encoding can transform the acquired seismic data and associated synthetic seismic data into probability-density functions or probability-density function-like data. Determination module 583 can include program instructions that, when executed by the processing resource 576, determine a 1D Wasserstein distance between the exponentially encoded acquired seismic data and the exponentially encoded associated synthetic data and determine a Fréchet derivative of the determined 1D Wasserstein distance. The acquired seismic data and associated synthetic seismic data being exponentially encoded, makes the acquired seismic data and associated synthetic seismic data for the Wasserstein distance determination. The Wasserstein distance, in at least one embodiment can be determined using extracted phase information from the acquired seismic data. For instance, because phase information is preserved during the exponential encoding, phase information can be extracted from the acquired seismic data and used in a Wasserstein distance determination. This can be advantageous, as the use of phase information can improve accuracy of models and/or images resulting from FWI.

Performance module 584 can include program instructions that, when executed by the processing resource 576, generates an adjoint source associated with the determined 1D Wasserstein distance and its Fréchet derivative to perform backpropagation and build a gradient. In at least one embodiment, a dynamic weight implementation of a sensitivity kernel can be adapted to the adjoint source to build the gradient. Performance module 584, in at least one embodiment performs a first plurality of iterations of an inversion based on the gradient, switches a sign of an encoding parameter associated with the exponential encoding, and performs a second plurality of iterations of the inversion using the switched encoding parameter sign. The encoding parameter comprises a quantity whose value is selected for the particular circumstances and in relation to which other variable quantities may be expressed. For instance, the inversion is performed in an alternative manner such that, the exponential encoding parameter is switched between $\tilde{d}=e^{\alpha d}$ and $\tilde{d}=e^{-\alpha d}$ every few iterations. In at least one embodiment, the performance module 584 generates an image of a subsurface location based on the first and the second pluralities of iterative inversions. For instance, models can be improved until a desired, final model is reached.

The machine 564, through executable instructions and/or hardwired circuitry, can be configured to exponentially encode acquired seismic data and associated synthetic seismic data. The machine 564 can be configured to determine a 1D Wasserstein distance between the exponentially encoded acquired seismic data and the exponentially encoded associated synthetic seismic data. In at least one embodiment, determining the 1D Wasserstein distance includes transforming the exponentially encoded acquired seismic data to a first energy form and the exponentially encoded associated synthetic seismic data to a second energy form. For example, the exponential encoding to the first energy form and the second energy form can be performed using an exponential encoding map:

$$\tilde{d}=e^{-\alpha d}.$$

The first and the second energy forms, in at least one embodiment, are exponentially encoded acquired seismic data and exponentially encoded associated seismic data that have been balanced. For instance, both positive and negative portions of the exponentially encoded acquired seismic data and the exponentially encoded associated seismic and their associated phase information are considered.

Because the Wasserstein distance measures the difference between nonnegative measures or functions with equal mass, which are not natural constraints for seismic data, the first and the second energy forms are normalized prior to determining a Wasserstein distance between the two. In at least one embodiment, the second energy form, which is associated with the associated simulated seismic data is normalized based on the first energy form, which is associated with the acquired seismic data. For instance, the second energy form may be normalized to be comparable to the first energy form, or the first energy form can be normalized, and the second energy form can be normalized in response.

The determination of the 1D Wasserstein distance also includes, in at least one embodiment, tracing levels of the first energy form and the second energy form to obtain corresponding arrival time functions such that the levels are analyzed trace-by-trace. $L^2$ norms of the obtained arrival time functions are determined, and a difference between the obtained arrival time functions is determined based on the $L^2$ norms. As used herein, the arrival time functions comprise functions associated with arrival times of the levels of the first energy form and the second energy form. For example, responsive to the acquired seismic data and the associated synthetic seismic data being encoded and normalized, cumulative functions can be calculated for each set of exponentially encoded seismic data such that the value of each respective cumulative function is referred to as an energy form. Put another way, a cumulative function value associated with the acquired seismic data may be referred to as a first energy form, while a cumulative function value associated with the associated synthetic seismic data may be referred to as a second energy form. The inverse of the first energy form is interpreted as an arrival time function associated with the acquired seismic data. The inverse of the second energy form is interpreted as an arrival time function associated with the associated synthetic seismic data. Put another way, a time difference between the two energy forms is tracked trace-by-trace when the two energy forms achieve a same energy form level. As used herein, an energy form level comprises a fixed amount of energy associated with an energy form. A difference between the arrival time functions can be determined as a Wasserstein distance, in at least one embodiment, and can be used to generate the adjoint source. For instance, an $L^2$ norm of the time difference is the Wasserstein distance between traces of the two energy forms.

In at least one embodiment of the present disclosure, the machine 564 can be configured to generate the adjoint source based on the determined distance and adapt a dynamic weight implementation of a sensitivity kernel, such as a velocity sensitivity kernel or an impedance sensitivity kernel, to the adjoint source to build a gradient associated with the acquired seismic data and the associated synthetic seismic data. In at least one embodiment, the machine 564 can be configured to generate an image of a subsurface location based on the adjoint source having the adapted dynamic weight implementation. The adjoint source or the image, in at least one embodiment, is used to determine a property of the subsurface, such as the presence of a reservoir that may contain hydrocarbons.

In accordance with at least one embodiment of the present disclosure, a geophysical data product or seismic image may be produced. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. In at least one embodiment, the seismic image can be recorded on one or more non-transitory machine-readable media, thereby generating the geophysical data product.

FIGS. 6A, 6B, 6C, and 6D illustrate diagrams 680, 681, 682, and 683 of results of an example physical experiment for inversion with exponentially encoded seismic data. For example, the physical experiment considered a synthetic 2D model referred to with respect to FIGS. 6A, 6B, 6C, and 6D, as the "true model." A true model, as used herein, is a model used to simulate data input into an inversion. In at least one embodiment, the true model is a velocity model.

Figure 6A:
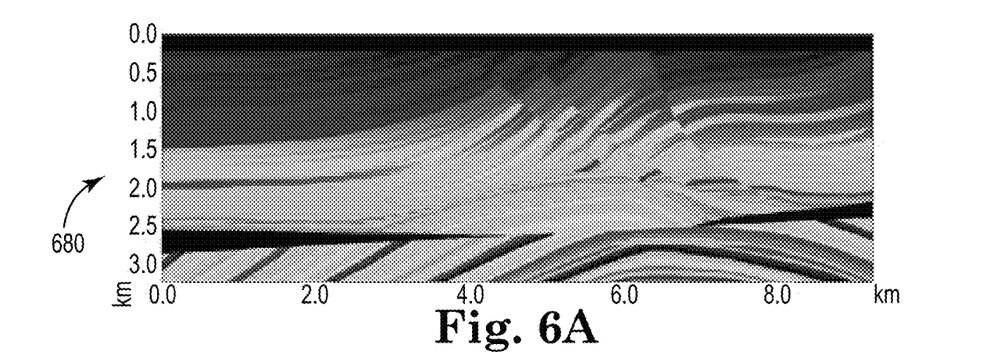
FIGS. 6A, 6B, 6C, and 6D illustrate diagrams of results of an example physical experiment for inversion with exponentially encoded seismic data.

Diagram 680 of FIG. 6A illustrates the true model including reflectors, steep dips, and strong velocity variations in both the lateral and the vertical direction. In the example illustrated in FIG. 6A, the velocity model is 9.2 km×3.2 km, and synthetic seismic data was created with a minimum frequency of 5 Hz (zero power) and 7 Hz full power. For acquisition geometry, the sources and receivers are uniformly distributed every 20 meters at 40 meters depth. The maximum recording time is 8 seconds. In the example, 31 sources are randomly selected per iteration.

Figure 6B:
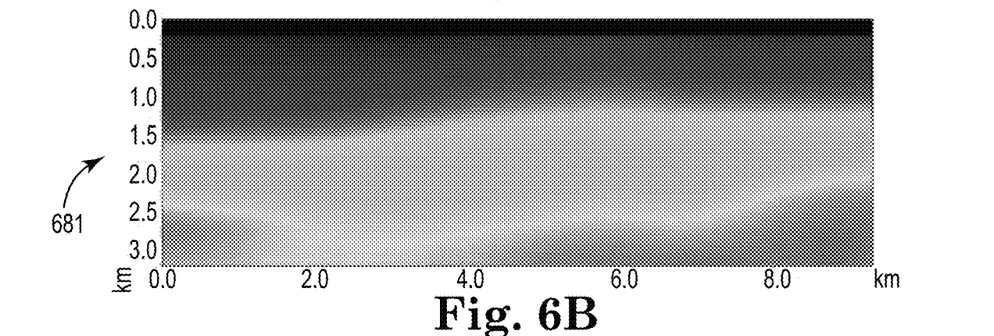
Figure 6C:
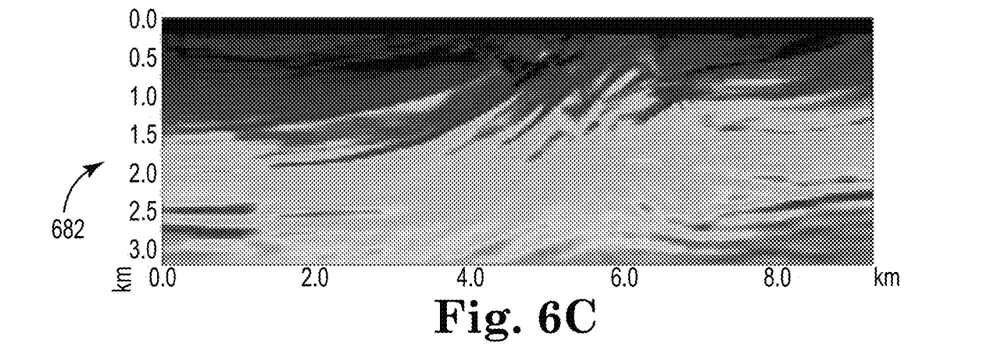
Figure 6D:
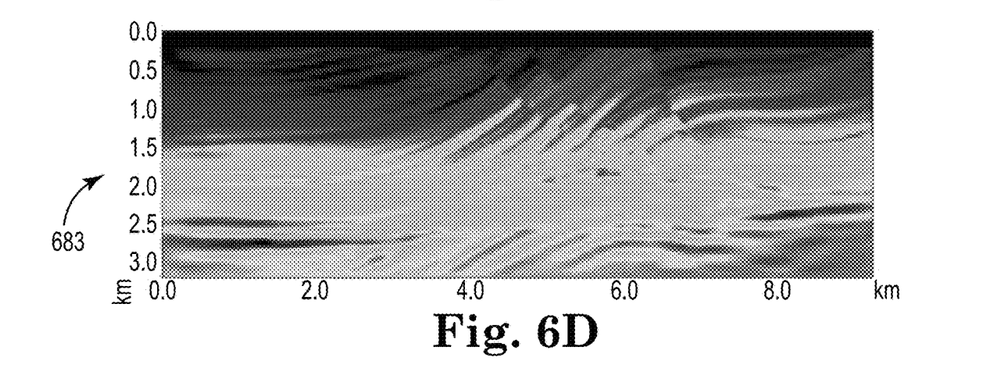

FIG. 6B illustrates a diagram 681 of an initial model created by smoothing the true model using a Gaussian filter with 2 km correlation length. With the initial model, an inversion such as FWI with an $L^2$ norm does not provide a desirable reconstruction. The undesirable reconstruction is illustrated in diagram 682 of FIG. 6C. In contrast, with the initial model, an inversion such as FWI with a $W^2$ norm provides a desirable reconstruction. The desirable reconstruction is illustrated in diagram 683 of FIG. 6D. Diagram 683 illustrates a result closer to that of the true model of diagram 680, as compared to the result of diagram 682.

FIGS. 7A, 7B, 7C, and 7D illustrate diagrams of results of an example physical experiment for inversion with exponentially encoded seismic data. For example, the physical experiment considered a velocity model referred to with respect to FIGS. 6A, 6B, 6C, and 6D, as the "true model." A true model, as used herein, is a model used to simulate data input into an inversion.

Figure 7A:
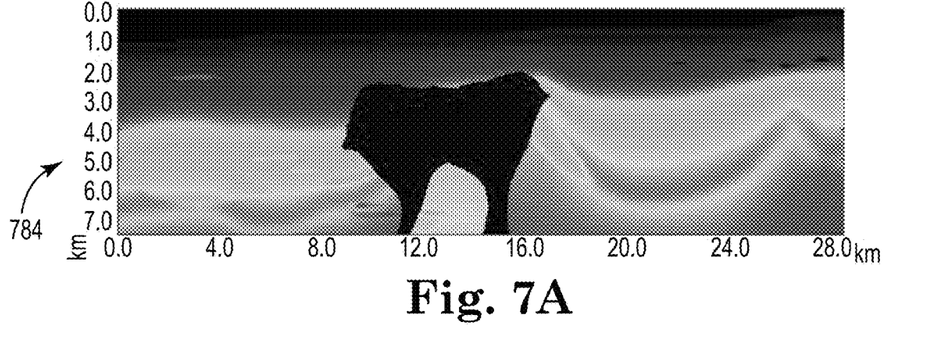
FIGS. 7A, 7B, 7C, and 7D illustrate diagrams of results of an example physical experiment for inversion with exponentially encoded seismic data.

Diagram 784 of FIG. 7A illustrates the true model, which is 28.5 km×7.5 km and comprises a salt body in the middle of the domain of interest. Synthetic seismic data was created with a minimum frequency of 1 Hz (zero power) and 3 Hz full power. For acquisition geometry, the sources are uniformly distributed every 40 meters, and the receivers are deployed every 40 meters with a maximum offset of 20 km. Both the sources and receivers are located at 40 meters depth. With this long-offset setting, the maximum recording time of seismic data is 12 seconds. In the example, 36 actuations are randomly selected and used per iteration.

Figure 7B:
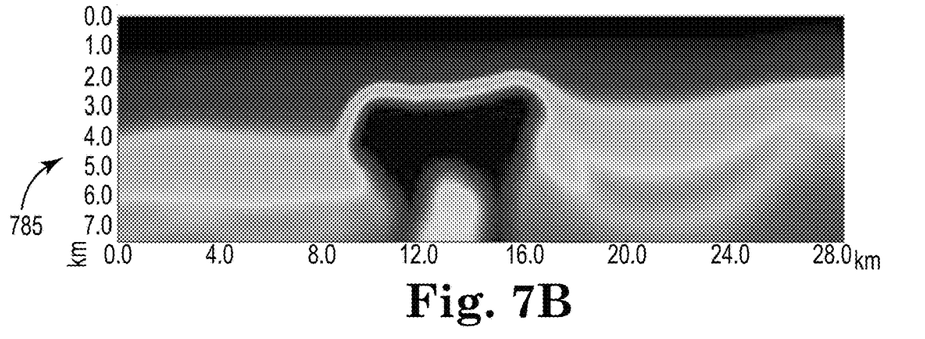
Figure 7C:
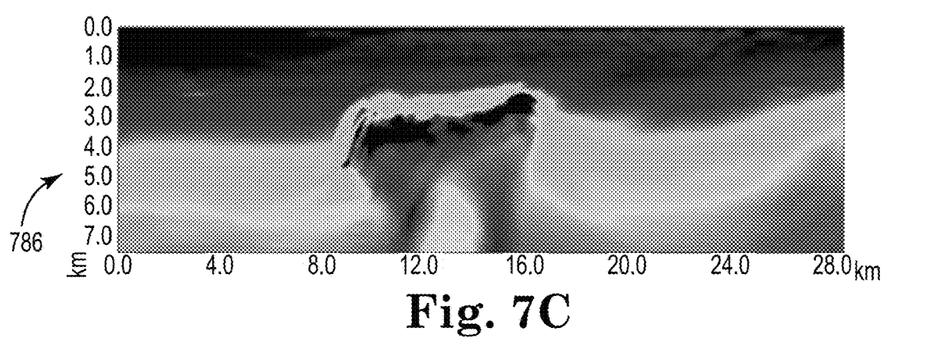
Figure 7D:
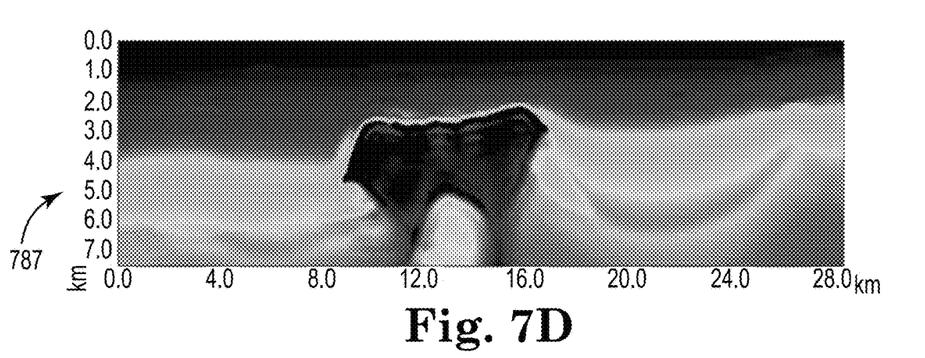

FIG. 7B illustrates a diagram 785 of a heavily smoothed model, having a 1.1 km correlation length, from the true model with the water layer fixed. This is used as a starting velocity model for FWI. From this starting velocity model, FWI with an $L^2$ norm may not recover the salt boundary, as illustrated in diagram 786 of FIG. 7C. As shown in diagram 787 of FIG. 7D, FWI with a $W^2$ norm produces an improved reconstruction. The salt body shallower than 7 km is restored.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments can provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   exponentially encoding acquired seismic data and associated synthetic seismic data;
   storing the exponentially encoded acquired seismic data and the exponentially encoded associated synthetic seismic data;
   determining a one-dimensional (1D) Wasserstein distance between the exponentially encoded acquired seismic data and the exponentially encoded associated synthetic seismic data;
   generating an adjoint source based on the 1D Wasserstein distance;
   adapting a dynamic weight implementation of a sensitivity kernel to the adjoint source to build a gradient associated with the acquired seismic data and the associated synthetic seismic data;
   iteratively inverting a waveform associated with the exponentially encoded acquired seismic data and the exponentially encoded associated synthetic seismic data based on the gradient; and
   generating an image of a subsurface location based on results of the iterative inversions.

2. The method of claim 1, further comprising determining wave velocity and impedance physical parameters of the subsurface location associated with the acquired seismic data based on results of the iterative inversions.

3. The method of claim 1, further comprising adapting the dynamic weight implementation of a velocity sensitivity kernel to the adjoint source.

4. The method of claim 1, further comprising adapting the dynamic weight implementation of an impedance sensitivity kernel to the adjoint source.

5. The method of claim 1, further comprising backpropagating a data misfit between the acquired seismic data and the associated synthetic seismic data from a sea surface to a subsurface location.

6. The method of claim 1, further comprising normalizing the exponentially encoded acquired seismic data to transform the acquired seismic data to a probability-density function.

7. The method of claim 1, further comprising normalizing the exponentially encoded associated synthetic seismic data to transform the associated synthetic seismic data to a probability-density function.

8. The method of claim 1, wherein iteratively inverting comprises iteratively inverting the exponentially encoded acquired seismic data and the exponentially encoded associated synthetic seismic data via full waveform inversion.

9. The method of claim 1, further comprising:
   determining a Fréchet derivative of the 1D Wasserstein distance; and
   generating the adjoint source based on the 1D Wasserstein distance and the Fréchet derivative.

10. A system, comprising:
    means for exponentially encoding acquired seismic data and associated synthetic seismic data;
    means for storing the exponentially encoded acquired seismic data and the exponentially encoded associated synthetic seismic data;
    means for determining a one-dimensional (1D) Wasserstein distance between the exponentially encoded acquired seismic data and the exponentially encoded associated synthetic seismic data, wherein the means for determining comprises:
      means for transforming the exponentially encoded acquired seismic data to a first energy form and the exponentially encoded associated synthetic seismic data to a second energy form;
      means for normalizing second energy form based on the first energy form;
      means for tracing levels of the first energy form and the second energy form to obtain corresponding arrival time functions;
      means for determining least-square norms of the obtained arrival time functions; and
      means for determining a difference between the obtained arrival time functions based on the least-square norms;
    means for generating an adjoint source based on the determined difference; and
    means for adapting a dynamic weight implementation of a sensitivity kernel to the adjoint source to build a gradient associated with the acquired seismic data and the associated synthetic seismic data; and
    means for generating an image of a subsurface location based on the adjoint source having the adapted dynamic weight implementation.

11. A non-transitory machine-readable medium storing instructions executable by a processing resource to:
    exponentially encode acquired seismic data and associated synthetic seismic data;
    store the exponentially encoded acquired seismic data and the exponentially encoded associated synthetic seismic data;
    determine a one-dimensional (1D) Wasserstein distance between the exponentially encoded acquired seismic data and the exponentially encoded associated synthetic seismic data;
    determine a Fréchet derivative of the determined 1D Wasserstein distance;
    generate an adjoint source associated with the determined 1D Wasserstein distance and its Fréchet derivative to perform backpropagation and build a gradient;
    perform a first plurality of iterations of an inversion based on the gradient;
    switch a sign of an encoding parameter associated with the exponential encoding;
    perform a second plurality of iterations of the inversion using the switched encoding parameter sign; and
    generate an image of a subsurface location based on the first and the second pluralities of iterative inversions.

12. The medium of claim 11, further comprising instructions to adapt a dynamic weight implementation of a sensitivity kernel to the adjoint source to build the gradient.

13. The medium of claim 11, further comprising instructions to:
extract phase information from the acquired seismic data; and
determine the 1D Wasserstein distance using the extracted phase information.

14. A system, comprising:
a source;
a plurality of receivers; and
a controller coupled to the source and the plurality of receivers, wherein the controller is configured to:
exponentially encode acquired seismic data and associated synthetic seismic data;
determine a one-dimensional (1D) Wasserstein distance between the exponentially encoded acquired seismic data and the exponentially encoded associated synthetic seismic data;
generate an adjoint source based on the 1D Wasserstein distance;
adapt a dynamic weight implementation of a sensitivity kernel to the adjoint source to build a gradient associated with the acquired seismic data and the associated synthetic seismic data; and
iteratively perform a full waveform inversion on a waveform associated with the exponentially encoded acquired seismic data and the exponentially encoded associated synthetic seismic data based on the adjoint source having the adapted dynamic weight implementation; and
generate an image of a subsurface location based on results of the iterative full waveform inversions.

15. The system of claim 14, wherein the controller is further configured to preserve phase information associated with the acquired seismic data and associated synthetic seismic data.

16. The system of claim 14, wherein the acquired seismic data has a frequency above a particular threshold.

17. The system of claim 14, wherein the controller is further configured to transform the acquired seismic data and the associated synthetic seismic data to probability-density functions during exponential encoding.

18. The system of claim 14, wherein the controller is further configured to generate the adjoint source based on a difference between a first arrival time function associated with the acquired seismic data and a second arrival time function associated with the associated synthetic seismic data.

19. The system of claim 14, wherein the controller is further configured to calculate a data misfit between the acquired seismic data and the associated synthetic seismic data.

20. A method of manufacturing a geophysical data product, the method comprising:
generating geophysical data, wherein generating the geophysical data comprises:
exponentially encoding acquired seismic data and associated synthetic seismic data;
determining a one-dimensional (1D) Wasserstein distance between the exponentially encoded acquired seismic data and the exponentially encoded associated synthetic seismic data;
generating an adjoint source based on the 1D Wasserstein distance;
adapting a dynamic weight implementation of a sensitivity kernel to the adjoint source to build a gradient associated with the acquired seismic data and the associated synthetic seismic data; and
iteratively inverting a waveform associated with the exponentially encoded acquired seismic data and the exponentially encoded associated synthetic seismic data based on the gradient;
processing the geophysical data to generate a seismic image; and
recording the geophysical data or the seismic image on one or more non-transitory machine-readable media, thereby completing the manufacture of the geophysical data product.

* * * * *